ALVIN E. SCHUBERT
INVENTOR.

BY R. Frank Smith
Robert W. Hampton
ATTORNEYS

ALVIN E. SCHUBERT
INVENTOR.
ATTORNEYS

Sept. 15, 1964  A. E. SCHUBERT  3,148,607
EXPOSURE CONTROL APPARATUS FOR PHOTOGRAPHIC CAMERAS
Filed March 6, 1959  4 Sheets-Sheet 3

ALVIN E. SCHUBERT
INVENTOR.

BY R. Frank Smith
Robert W. Hampton
ATTORNEYS

Sept. 15, 1964　　　A. E. SCHUBERT　　　3,148,607
EXPOSURE CONTROL APPARATUS FOR PHOTOGRAPHIC CAMERAS
Filed March 6, 1959　　　　　　　　　　　　　　4 Sheets-Sheet 4

ALVIN E. SCHUBERT
INVENTOR.

BY R. Frank Smith
Robert W. Hampton
ATTORNEYS

United States Patent Office 3,148,607
Patented Sept. 15, 1964

3,148,607
EXPOSURE CONTROL APPARATUS FOR
PHOTOGRAPHIC CAMERAS
Alvin E. Schubert, Rochester, N.Y., assignor to Eastman Kodak Company, Rochester, N.Y., a corporation of New Jersey
Filed Mar. 6, 1959, Ser. No. 797,613
9 Claims. (Cl. 95—64)

The present invention relates to photographic cameras having automatic exposure control systems and more particularly concerns manual clamping means for such systems.

Many photographic cameras are provided with automatic exposure control systems by means of which the exposure of film in such cameras is regulated automatically as a function of the intensity of light from the scene or object that is to be photographed. The exposure can be regulated by controlling either the exposure aperture or the shutter speed or both. Automatic exposure control systems customarily include a photoelectric cell which drives an electric measuring instrument such as a pivoted-coil galvanometer. The combination of cell and galvanometer constitutes a photoelectric-to-mechanical transducer in which the pivoted coil is a mechanical output member. Instead of a galvanometer, the transducer may comprise a hot-wire actuator, a solenoid or other device having a mechanical output member which can be positioned as a function of the amplitude of the input signal from a photoelectric cell.

A camera that is equipped with an automatic exposure control system ordinarily requires no manual setting of the exposure factors. However, in situations where there is unusual backlighting of the subject, or for any other reason a deliberate overexposure or underexposure is desired, it is convenient to provide manually operable means for locking the automatic exposure control system at a particular setting.

It is therefore a primary object of the present invention to lock the automatic exposure control system of a camera at any convenient setting. This object is realized in the provision of a manually operable clamping device which holds the mechanical output member of a photoelectric-to-mechanical transducer, e.g., the pivoted coil of a galvanometer, as well as any exposure control mechanism driven thereby, in any position of operation that it has assumed when the clamping device is operated. The manually controlled clamping may be effected by means of a slidable or rotatable knob, for example, with a camming member controlled by the knob and in turn controlling the application of a braking force to the coil or to the exposure control mechanism. The latter mechanism may be, for example, the blade or vane of a diaphragm, or it may be a shutter speed ring.

It is therefore a further object of the invention to brake an automatic exposure control system in a camera.

Another object is to effect such braking by a manually controlled cam member which, in turn, controls a leaf-spring brake.

Other objects of the invention will appear from the following description, reference being made to the accompanying drawings wherein.

Figure 1:
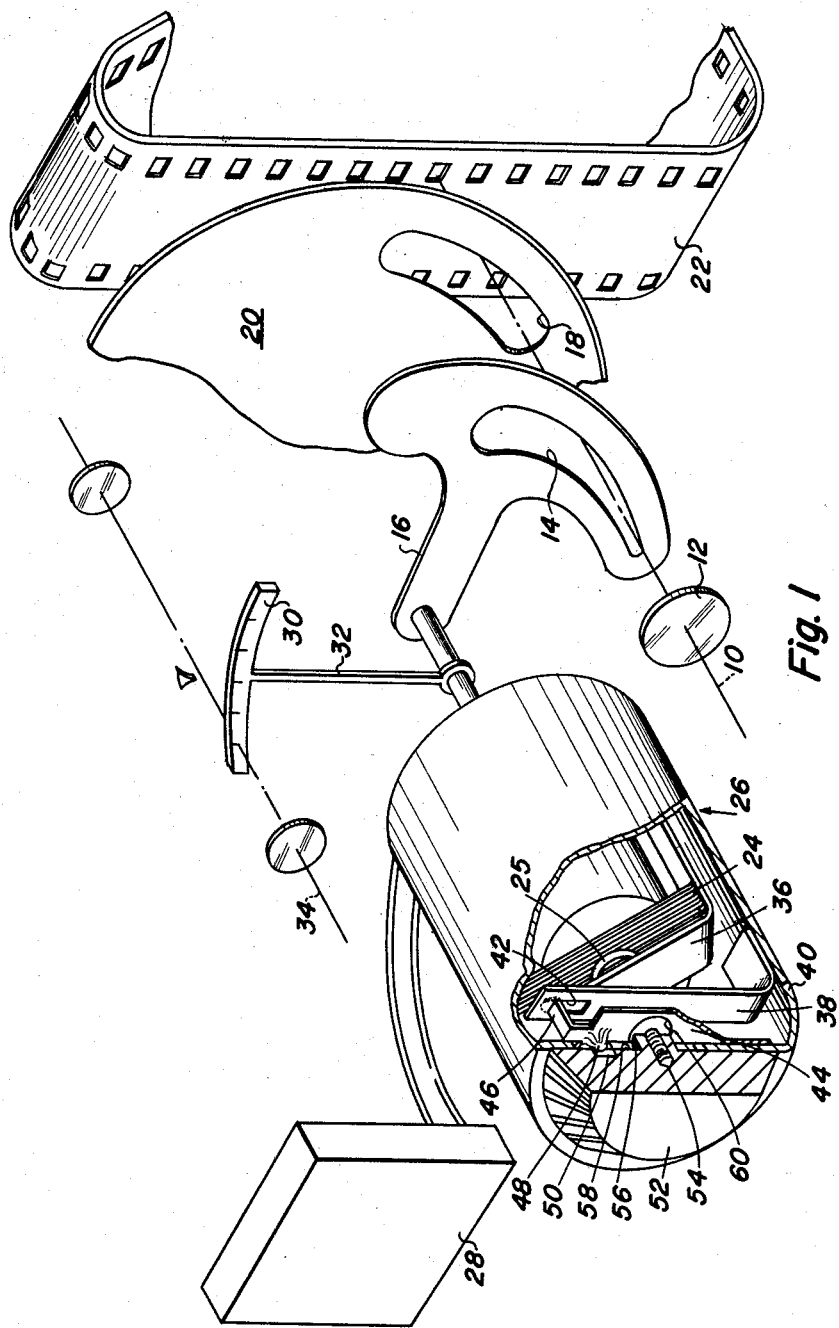
FIG. 1 is an exploded isometric view of the exposure elements and clamping mechanism of a camera embodying one form of the invention.
Figure 2:
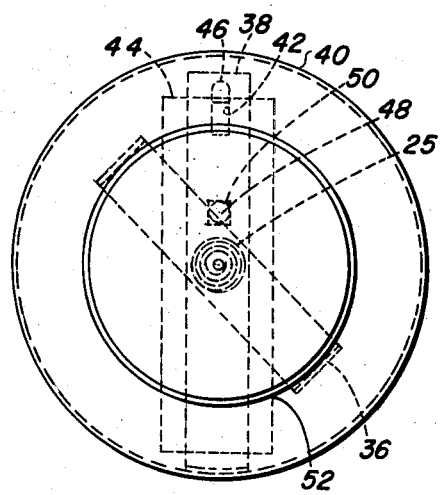
FIG. 2 is a front view of the clamping mechanism shown in FIG. 1.

Referring to FIG. 1, a typical camera embodying the present invention has a lens axis 10, with which are aligned a lens system indicated generally at 12, an elongated, tapered aperture 14 of a diaphragm vane 16, the rotary path of an aperture 18 in a shutter 20, and a photosensitive surface such as a filmstrip 22. The diaphragm vane 16 is connected to and angularly positioned by the pivoted coil 24 of a galvanometer-type electric measuring instrument 26, which in turn is connected to and energized by a photoelectric cell 28. The cell is positioned for exposure to the scene or object that is to be photographed and energizes the instrument coil as a function of scene brightness thereby rotating the coil against the tension of a return spring 25. Vane 16 moves with coil 24 and moves aperture 14 relative to the lens axis for establishing an exposure aperture whose area is a function of scene brightness. The cell 28 and the exposure control system comprising instrument 26 and the diaphragm or other exposure-regulating mechanism, are well known to those skilled in the art and will not be described in detail.

When the camera is to be used in situations involving unusual backlighting, the photographer may use the present clamping invention in any of its forms to hold the diaphragm blade in its proper setting, regardless of the intensity of the overall light from the viewed scene. In this instance the camera may be held close to the subject so that the automatic exposure control system adjusts the diaphragm opening to the proper value in accordance with the intensity of the light coming from the subject itself. The photographer may then clamp the diaphragm in that position and back away to the desired distance from the subject in order to make the photographic exposure. In other situations where it is desired to make a deliberate underexposure or overexposure, the photographer may point the camera toward a bright area or a dark area, or between them until the diaphragm is set to any desired aperture value, then clamp the diaphragm at that setting and make the exposure. To aid the photographer in reading the diaphragm setting of the camera, an aperture scale 30 may be mounted on an arm 32 for angular movement with the instrument coil 24 such that the scale can be seen through a viewfinder, whose axis is shown at 34.

A first form of the clamping mechanism, illustrated in FIGS. 1-4, comprises a U-shaped bracket 36 mounted on the instrument coil 24 for rotation therewith. An L-shaped leaf spring brake 38 has its shorter leg secured to an inner side wall of an instrument housing 40 and has an aperture 42 near the end of its longer leg. Brake 38 is spring biased toward engagement with bracket 36 but normally is held out of engagement with that bracket (FIG. 3) by a second and stronger leaf spring 44 having an L-shaped tab 46 which extends through aperture 42 for engagement with the rearward surface of brake 38. Spring 44 is secured at its lower end to the inner front wall of housing 40 and is biased away from the instrument coil 24 and bracket 36. A boss 48 formed in spring 44 cooperates with a recess 50 in the rear surface of a manual control knob 52, which is mounted on the outer front wall of housing 40 by a screw 54.

Figure 3:
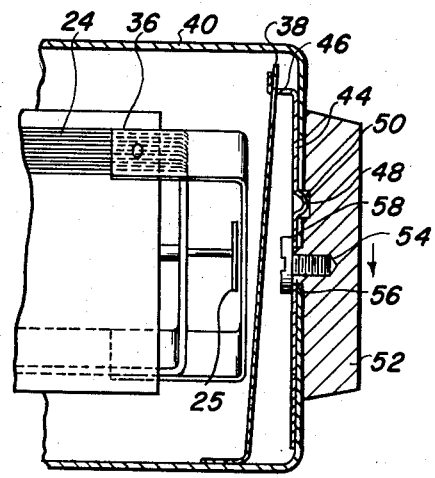
FIGS. 3 and 4 are left side views of the mechanism shown in FIG. 2 indicating the unclamped and clamped states, respectively, of that mechanism.
Figure 4:
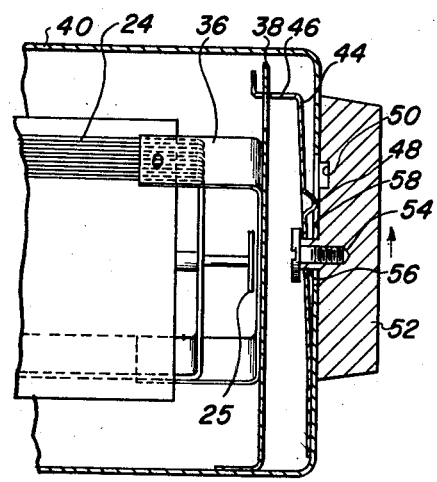

When knob 52 is in the position shown in FIG. 3, boss 48 engages recess 50, thereby permitting spring 44 to hold brake 38 out of engagement with bracket 36 and permitting the exposure control system to operate automatically. When knob 52 is moved upward by manual sliding action to the position shown in FIG. 4, its hub 56 (FIGS. 2 and 3) moves in a slot 58 in the front of casing 40, and recess 50 moves out of engagement with boss 48. Therefore, the inner face of knob 52 cams boss 48 and spring 44 toward bracket 36, thereby permitting brake 38 to engage the bracket and hold it and the instrument coil 24 against further angular movement. An aperture 60 in spring 44 receives hub 56 of the knob and permits spring 44 to move forward and backward around the hub.

Figure 5:
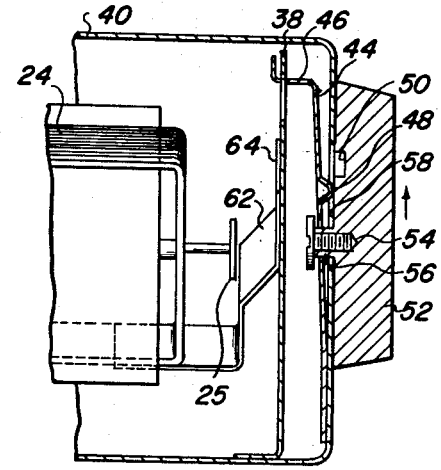
FIG. 5 is a left side view of a modification of the clamping mechanism shown in FIG. 4.

A modification of the above clamping device is shown in FIG. 5, wherein a leaf-spring member 62 replaces bracket 36 of FIGS. 1–4. Spring member 62 is secured at only one end to the instrument coil; its other end has a free tip 64 cooperating with brake 38. This modification of the brake-load receiving member provides an additional cushion in the braking mechanism to minimize shock stress on the instrument bearings during the clamping operation.

Figure 6:
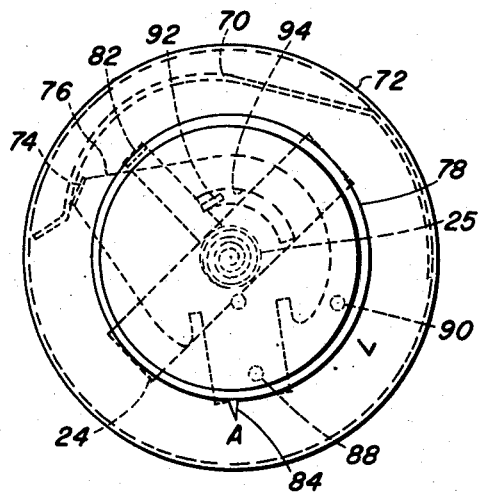
FIGS. 6 and 7 are front and left side views, respectively, of a third form of the invention, showing its unclamped state.
Figure 7:
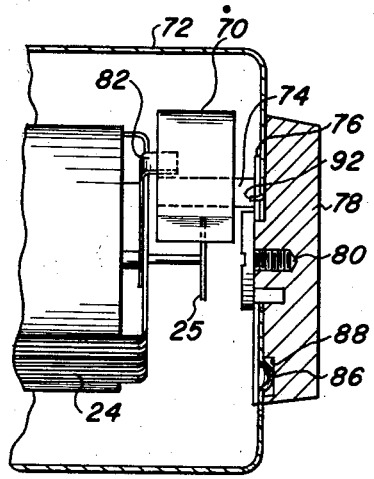
Figure 8:
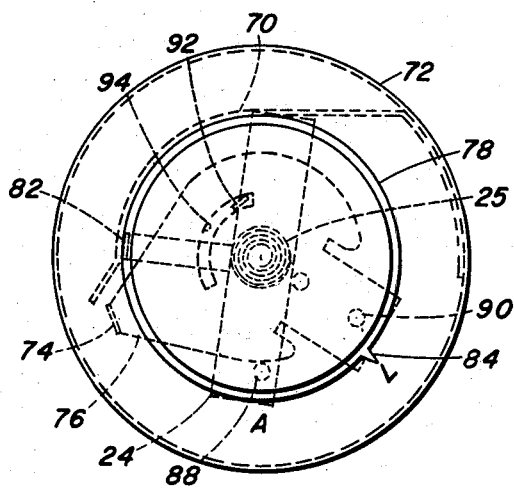
FIG. 8 is a front view of the third form of the invention, showing its clamped state.

A third form of the invention is shown in FIGS. 6–8 wherein the braking member comprises a leaf spring 70 having one end secured to the inner side wall of the housing 72 and having its free end biased radially inward. The position of brake 70 is controlled by a cam arm 74 on a member 76 which is secured to a rotatable knob 78. This knob is secured to the front wall of housing 72 by a screw 80 (FIG. 7). When knob 78 is in its clockwise position, as shown in FIG. 6, the camming arm 74 engages the inner surface of brake 70 and holds the brake radially outward. When knob 78 is turned counterclockwise to the position shown in FIG. 8, the camming arm disengages brake 70, permitting the brake to spring inward. An arm 82, which is integral with the instrument coil 24, cooperates with brake 70 when the control knob 78 is in its counterclockwise position, as shown in FIG. 8. In the latter position of the knob, the brake engages arm 82 and prevents the coil from turning. When knob 78 is turned clockwise, as shown in FIG. 6, brake 70 disengages arm 82 and permits the exposure control system to operate automatically.

A pointer 84 may be provided on knob 78 to cooperate with a pair of indicia such as "A" and "L," indicating the "automatic" and the "locked" positions, respectively, of the knob. This knob also may be recessed, such as at 88 and 90 (FIG. 7), to cooperate with a boss 85 (FIGS. 6 and 8) in the front wall of housing 72 to act as detents for yieldably retaining the knob in either of its two rotated positions. An ear 92 extending inward from the front wall of housing 72 may be provided for cooperating with a slot 94 (FIGS. 6 and 8) in the camming member 76 to limit the angular movement of that member.

Two further forms of the invention are shown in FIGS. 9–12, wherein the braking force is applied directly to an exposure-setting device, such as the diaphragm vane.

Figure 9:
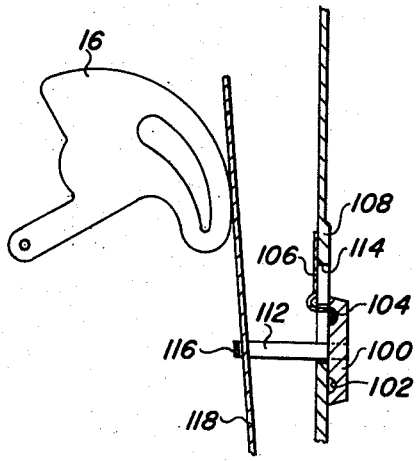
FIGS. 9 and 10 are left side views of a fourth form of the invention.
Figure 10:
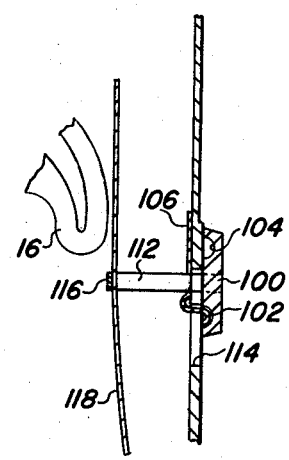

In FIGS. 9 and 10, a manually slidable knob 100 has a pair of recesses 102 and 104 cooperating with a leaf spring 106, the upper end of which is fixed to the inner surface of an outer wall 108 of the camera. Spring 106 and recesses 102 and 104 act as detents for yieldably retaining knob 100 in its lower position (FIG. 9) or in its upper position (FIG. 10). A shaft 112 extends inwardly from knob 100 and moves in a vertical slot 114 in wall 108 when the knob is moved vertically. An ear 116 on the inner end of shaft 112 cooperates with a leaf-spring brake 118 which is secured at its lower end (not shown) to a fixed member such as wall 108. The upper end of brake 118 is biased away from wall 108 and toward the side edge of an exposure-setting member such as the diaphragm vane 16.

When knob 100 is in its upper position (FIG. 10), ear 116 engages brake 118 and pulls the brake away from the edge of the diaphragm vane, so that the exposure control system can operate automatically. On the other hand, when knob 100 is moved to its lower position (FIG. 9), ear 116 moves out of engagement with brake 118, so that the brake springs against the vane edge and prevents any further rotation of the vane.

Figure 11:
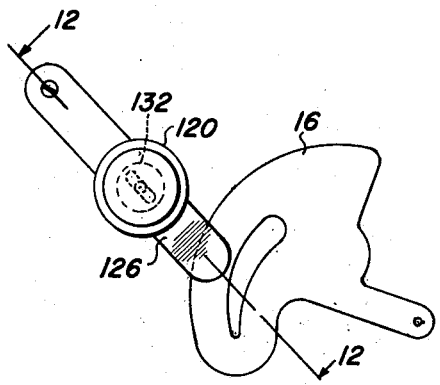
FIG. 11 is a front view of a fifth form of the invention.
Figure 12:
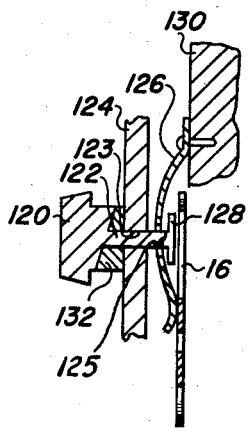
FIG. 12 is a sectional side view along the line 12—12 of FIG. 11.

In the form shown in FIGS. 11 and 12, the invention comprises a rotatable knob 120 having a shaft 122 extending through an aperture 123 in an outer wall 124 of the camera and through an aperture 125 in a leaf-spring brake 126. A disk 128 on the end of shaft 122 engages the inner surface of brake 126. One end of brake 126 is secured to a fixed member 130 of the camera and the other end of the brake cooperates with a flat face of an exposure-setting member such as diaphragm vane 16. A disk 132 is interposed between knob 120 and wall 124 and has an inclined outer face abutting a complementary inclined inner face of the knob. When knob 120 is in the position shown in FIG. 12, it is in full contact with the outer face of disk 132; therefore, disk 128 is in its maximum inward position and brake 126 engages the surface of vane 16, thereby preventing that vane from rotating. When knob 120 is rotated away from the position shown in FIG. 12, it is cammed to the left (as viewed in FIG. 12) by disk 132; therefore, disk 128 moves brake 126 away from vane 16 and the exposure control system operates automatically. Any convenient detenting means may be provided for yieldably retaining knob 120 in either of its two extreme rotating positions.

The invention has been described in detail with particular reference to preferred embodiments thereof, but it will be understood that variations and modifications can be effected within the spirit and scope of the invention as described hereinabove and as defined in the appended claims.

I claim:

1. In a camera having a photoelectric cell energizable by a scene which is to be photographed and an exposure control mechanism for automatically regulating the exposure of film in said camera as a function of the energization of said cell, said exposure control mechanism including an instrument connected electrically to said cell and having a movable element positioned as a function of the energization of said cell, apparatus for holding said movable element in a fixed position, comprising: a bracket member integral with said movable element and having a brake-receiving face; a brake; means resiliently biasing said brake toward an operative position for engaging the brake-receiving face of said bracket member; a manually operable control knob accessible to the photographer from the outside of the camera and movable between a first and a second position; and camming means movable by said control knob for holding said brake in an inoperative position when said control knob is in said first position and for releasing said brake for movement by said biasing means to said operative position when said control knob is in said second position.

2. The apparatus defined in claim 1, wherein said bracket member is U-shaped and secured at both of its ends to said movable element.

3. The apparatus defined in claim 1, wherein said bracket member comprises a leaf spring secured at only one end to said movable element.

4. The apparatus defined in claim 1, wherein said knob has a recess in one face thereof, and wherein said camming means comprises a resilient member normally disposed for engaging said brake and said recess when said knob is in said first position to hold said brake in one position relative to said brake-receiving face of said bracket member, said resilient member being moved out of said recess in response to movement of said knob to said second position for disengaging said resilient member from said brake, thereby permitting said brake to assume another position.

5. The apparatus defined in claim 1, wherein said movable element and knob move pivotally about respective parallel axes and said brake comprises a member having one end fixed relative to said movable element and the other biased toward the pivotal axis of said movable element and normally maintained by said camming member in a position radially outward from said movable element.

6. The apparatus defined in claim 1, wherein one end of said brake is fixed relative to said brake-receiving face of said bracket member and wherein said knob is disposed for linear movement between said first and second positions in a direction substantially parallel to said brake and carries a member for holding said brake out of engagement with said bracket member when and only when said knob is in said first position.

7. The apparatus defined in claim 1, wherein one end of said brake is fixed relative to said brake-receiving face of said bracket member and wherein said knob is disposed for turning movement between said first and second positions and carries a member for holding said brake out of engagement with said bracket member when and only when said knob is in said first position.

8. The apparatus defined in claim 1, wherein said movable element is disposed for pivotal movement about an axis and the engagement of said brake with said brake-receiving face of said bracket member is in a direction substantially parallel to said element axis.

9. The apparatus defined in claim 1, wherein said movable element is disposed for pivotal movement about an axis and the engagement of said brake with said brake-receiving face of said bracket member is in a direction substantially perpendicular to said element axis.

References Cited in the file of this patent
UNITED STATES PATENTS

| | | |
|---|---|---|
| 2,841,064 | Bagby et al. | July 1, 1958 |
| 2,887,025 | Rentschler et al. | May 19, 1959 |
| 2,923,170 | Pfaffenberger | Feb. 2, 1960 |